United States Patent
Pagoto

(10) Patent No.: US 10,587,104 B2
(45) Date of Patent: Mar. 10, 2020

(54) LOCKING GROMMET SYSTEM AND METHOD

(71) Applicant: Anthony S. Pagoto, Cutchogue, NY (US)

(72) Inventor: Anthony S. Pagoto, Cutchogue, NY (US)

(73) Assignee: Brian Fried, Melville, NY (US)

( * ) Notice: Subject to any disclaimer, the term of this patent is extended or adjusted under 35 U.S.C. 154(b) by 137 days.

(21) Appl. No.: 15/867,473

(22) Filed: Jan. 10, 2018

(65) Prior Publication Data

US 2018/0219365 A1  Aug. 2, 2018

Related U.S. Application Data

(60) Provisional application No. 62/453,729, filed on Feb. 2, 2017.

(51) Int. Cl.
*H02G 3/22* (2006.01)
*H02G 1/06* (2006.01)

(52) U.S. Cl.
CPC .................. *H02G 3/22* (2013.01); *H02G 1/06* (2013.01)

(58) Field of Classification Search
CPC ............. H02G 3/22; H02G 3/263; H02G 1/06
See application file for complete search history.

(56) References Cited

U.S. PATENT DOCUMENTS

| | | | |
|---|---|---|---|
| 3,397,280 A | 8/1968 | Klumpp, Jr. | |
| 4,144,616 A * | 3/1979 | Gould | H02G 3/083 16/2.1 |
| 4,656,689 A | 4/1987 | Dennis | |
| 5,069,586 A | 12/1991 | Casey | |
| 5,332,329 A * | 7/1994 | Hill | H02G 3/0658 403/261 |
| 5,627,343 A * | 5/1997 | Brandolf | H02G 3/22 156/86 |
| 5,639,993 A * | 6/1997 | Ideno | B60R 16/0222 174/153 G |
| 6,010,134 A * | 1/2000 | Katoh | B60R 16/0222 174/152 G |

(Continued)

*Primary Examiner* — Timothy J Thompson
*Assistant Examiner* — Rhadames Alonzo Miller
(74) *Attorney, Agent, or Firm* — Charles Runyan; Brian Fried

(57) ABSTRACT

A locking grommet system includes threaded-tube, locking-collar, and cover-plate. Locking grommet system is configured to penetrate a wall such that a user may pass objects through the wall penetration. Threaded-tube includes first-edge, second-edge, inside-surface, and outside-surface. Outside-surface includes male threads, and first-edge includes a lip. The lip is configured to contact a first-wall-surface. Cover plate is insertable into first-edge and configured to decrease the size of the opening of threaded-tube. Threaded-tube includes at least two tabs on inside-surface configured to provide user with a mechanism to rotate the threaded-tube in relation to the locking-collar. Locking-collar is cylindrical and includes collar-body and locking-tabs. The collar body includes front-edge, rear-edge, interior-surface, and exterior-surface. Interior-surface includes female threads configured to couple with male-threads of threaded-tube, and locking-tabs are configured to rotate outwardly from retracted position to extended position to contact a second-wall-surface.

17 Claims, 5 Drawing Sheets

(56) References Cited

U.S. PATENT DOCUMENTS

| | | | |
|---|---|---|---|
| 6,460,638 B1* | 10/2002 | Strunsee | H02G 3/083 16/2.2 |
| 6,495,755 B2 | 12/2002 | Burton et al. | |
| D588,442 S* | 3/2009 | Chong | D8/356 |
| 7,582,836 B2* | 9/2009 | Tapper | H02G 3/083 16/2.1 |
| 8,399,770 B1 | 3/2013 | Phillips, Jr. | F16B 7/182 174/142 |
| 2002/0038492 A1* | 4/2002 | Hashimoto | B60R 16/0222 16/2.1 |
| 2006/0033218 A1* | 2/2006 | Hafner | H01R 13/622 257/778 |
| 2006/0258195 A1* | 11/2006 | Schwartz | A47B 21/06 439/131 |
| 2007/0240902 A1* | 10/2007 | Tapper | H02G 3/088 174/660 |
| 2008/0200064 A1* | 8/2008 | Chong | H02G 3/22 439/571 |
| 2012/0031888 A1* | 2/2012 | Byrne | A47J 36/2461 219/201 |
| 2012/0305868 A1* | 12/2012 | Callahan | H02G 3/12 254/134.3 R |
| 2014/0158958 A1 | 6/2014 | Callahan et al. | |
| 2015/0129303 A1* | 5/2015 | Shitamichi | B60R 16/0222 174/72 A |
| 2015/0282611 A1* | 10/2015 | Herring | H02G 3/22 29/505 |
| 2015/0318679 A1* | 11/2015 | Nakai | H01R 13/5219 16/2.2 |
| 2015/0349505 A1* | 12/2015 | Yamazaki | H02G 3/22 174/650 |
| 2016/0039368 A1* | 2/2016 | Shitamichi | B60R 16/0222 16/2.2 |
| 2018/0151275 A1* | 5/2018 | Coyle | H02G 3/22 |

* cited by examiner

LOCKING GROMMET SYSTEM AND METHOD

CROSS-REFERENCE TO RELATED APPLICATION(S)

The present application is related to and claims priority to U.S. Provisional Patent Application No. 62/453,729 filed Feb. 2, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of hardware of existing art and more specifically relates to bushings and grommets.

RELATED ART

Generally, a grommet is a ring or edge strip placed within a hole in a material. Such materials typically include fabric, sheet metal, wood, or drywall. Grommets are generally collared to keep the grommet in place, and are often made of metal, plastic, or rubber materials. Grommets may be used to wear or provide protection from damage of the insulation on a wire, cable, or line routed through the hole in the material. Grommets may also be used to cover a sharp edge of the hole.

Grommets are available in many different configurations. Molded and continuous grommets are manufactured in a variety of sizes and lengths to fit specific applications, and may be cut to length by a user as needed. Two-piece grommets may also be used where each piece of the grommet is inserted from opposing sides of the hole and coupled together. A major limitation with available grommets is the tendency of the grommet to slip or move out of place. Also, the traditional two-piece grommet requires access to both sides of the hole. As such, the application of a two-piece grommet does not allow a user to insert such a grommet into existing drywall or other applications where access to both sides of the hole is limited. A suitable solution is desired.

U.S. Pub. No. 2014/0158958 to Daron Callahan et al. relates to a wall grommet for a power connection. The described wall grommet for a power connection includes a wall grommet for power connection, which can be installed through the surfaces of walls to route wiring in the wall's interior spaces. In particular, the wall grommet is configured for running power cords inside walls and presenting the electrical connectors of a power cord in a manner such that power cords are hidden from view. A housing may be configured to enclose and secure the electrical connector of the power cord in the housing. Toggles may be provided in conjunction with fasteners to secure module on the surface of a wall. Toggles comprise bores that are adapted to engage fasteners. Toggles may be disposed adjacent to the holes on the back surface of flange, such that the bores of toggles are aligned with the holes on the back surface of flange.

SUMMARY OF THE INVENTION

In view of the foregoing disadvantages inherent in the known bushings and grommets art, the present disclosure provides a novel locking grommet system and method. The general purpose of the present disclosure, which will be described subsequently in greater detail, is to provide an effective and efficient locking grommet system and method.

A locking grommet system is disclosed herein. The locking grommet system includes a threaded-tube, a locking-collar, and a cover-plate. The locking grommet system is configured to penetrate a wall such that a user may pass objects through the wall penetration, and may also pass such objects through the locking grommet system, with reduced risk of damage to the object.

The threaded-tube is cylindrical in shape and includes a first-edge, a second-edge, an inside-surface, and an outside-surface. The outside-surface includes male threads, and the first-edge includes a lip. The lip is configured to contact a first-wall-surface. The cover plate is insertable into the first-edge and configured to decrease the size of the opening of the threaded-tube. The threaded-tube includes at least two tabs integrated onto the inside-surface and configured to provide a user with a mechanism to rotate the threaded-tube in relation to the locking-collar.

The locking-collar is cylindrical in shape and includes a collar-body and locking-tabs. The collar body includes a front-edge, a rear-edge, an interior-surface, and an exterior-surface. The interior-surface includes female threads configured to couple with the male-threads of the threaded-tube, and the locking-tabs are configured to rotate outwardly from a retracted position to an extended position to contact a second-wall-surface. The locking-tabs include a textured surface to increase friction between the wall and the locking-tabs.

The threaded-tube and the locking-collar are preferably constructed from a non-metallic material such that the locking grommet system is non-electrically conductive, and the non-metallic material is preferably a polystyrene material.

According to another embodiment, a method of use for a locking grommet system is also disclosed herein. The method of use for a locking grommet system includes a first step, providing a locking grommet system (the locking grommet system including a threaded-tube, a locking-collar, and a cutting-tool); a second step, selecting a location on a wall where a hole is desired; a third step, threading the cutting-tool onto the threaded-tube; a fourth step, rotating the cutting-tool against the wall to cut a hole in the wall; a fifth step, unthreading the cutting-tool from the threaded-tube; a sixth step, threading the locking-collar onto the threaded-tube; a seventh step, inserting the locking-collar and the threaded-tube into the hole in the wall; an eight step, extending a pair of locking-tabs outward into an extended position; a ninth step, rotating the threaded-tube in relation to the locking-collar until the locking-tabs contained on the threaded tube contact the wall; and a tenth step, inserting electrical wire through the locking grommet system.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a locking grommet system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to bushings and grommets and more particularly to a locking grommet system as used to improve the durability, functionality, and ease of use of a wall grommet to protect electrical wires, conduit, and/or other items passing through a wall opening.

Generally, the locking grommet system is useful for providing a positive-locking grommet in order to reduce the chances of the grommet becoming loose within a wall or bulkhead. Additionally, the locking grommet system provides operation from one side of the wall and/or bulkhead when access to both sides may not be possible.

A locking grommet system includes a tubular main body that includes a lip, a secondary body on the outside of the main body, and at least two locking-tabs. The secondary body and main body are rotatable with respect to each other. When the secondary and main body is rotated with respect to each other, the locking-tabs extend axially from the main and secondary body, and also extend forward towards the lip of the main body. In order to operate the locking grommet system, the system may be placed within an opening of a wall or bulkhead. Once inserted, the lip on the main body is flush with the front side of wall surface.

The main body and secondary body are then rotated (with respect to each other) to extend the locking-tabs until they contact the back side of the wall surface to provide positive pressure upon the wall to secure the system within the hole. The user may then pull wires, cables, etc. through the locking grommet system and the wall.

Referring now more specifically to the drawings by numerals of reference, there is shown in FIGS. 1-4, various views of a locking grommet system 100.

Figure 1:
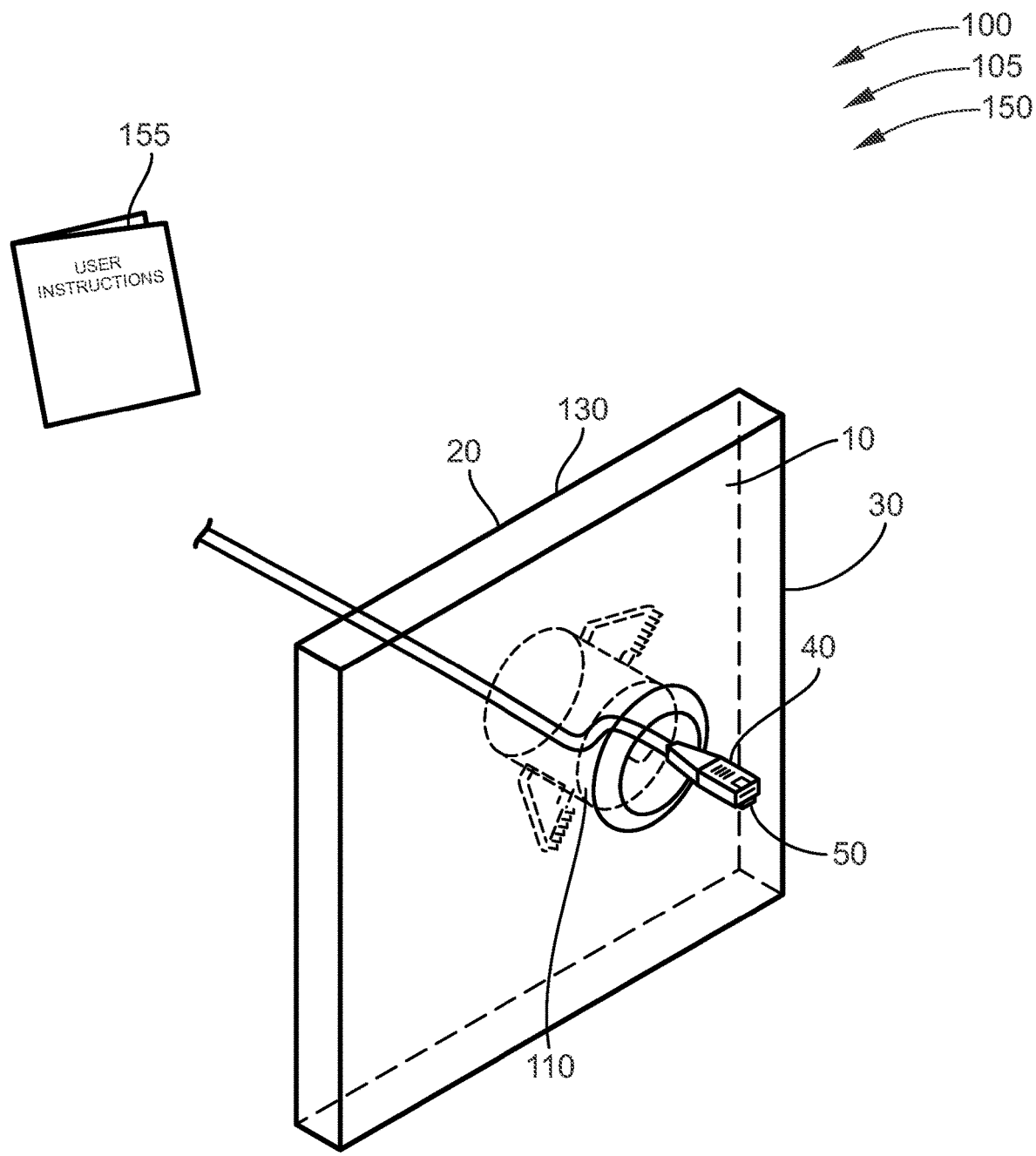
FIG. 1 is a perspective view of the locking grommet system during an 'in-use' condition, according to an embodiment of the disclosure.
Figure 2:
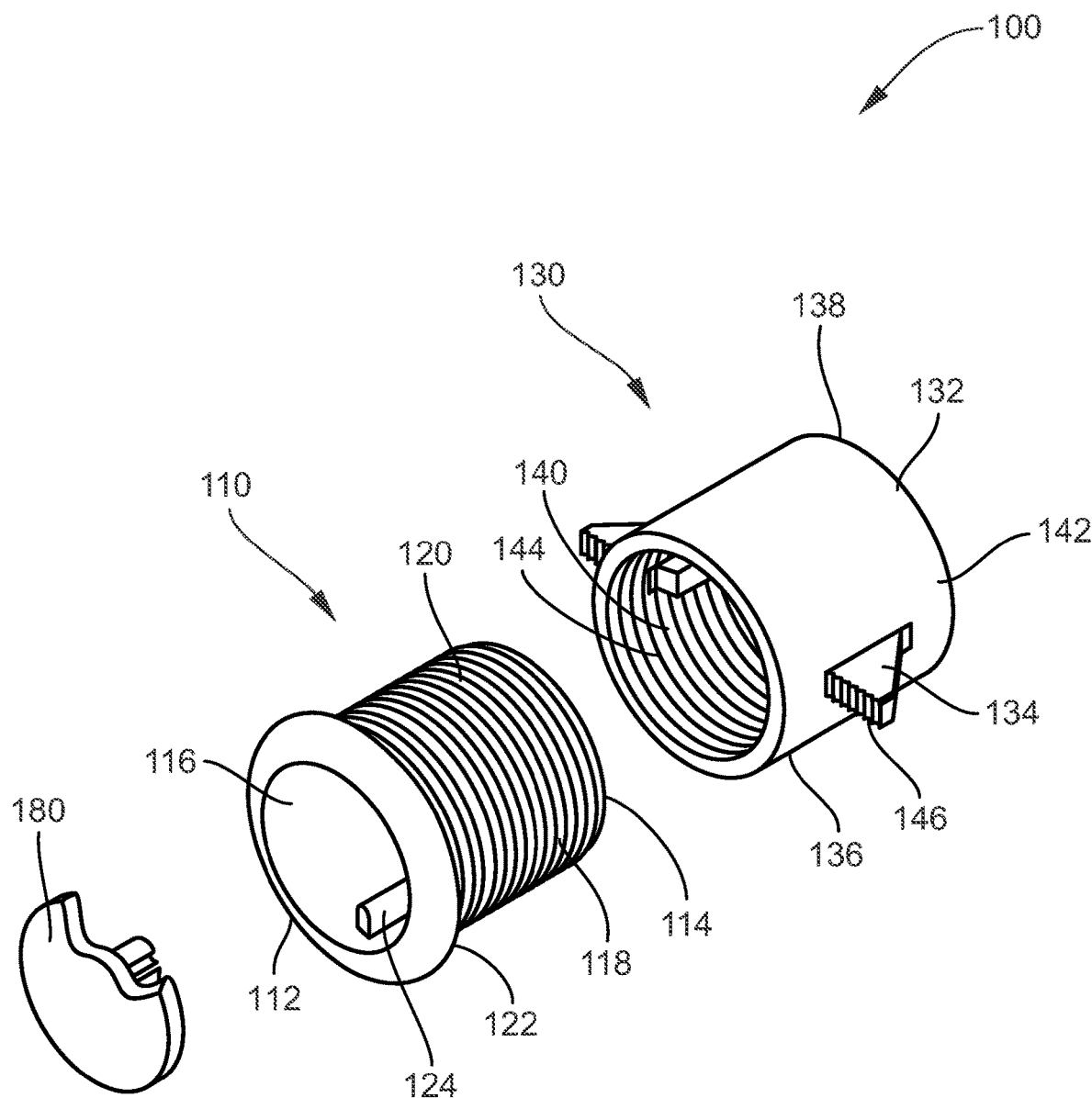
FIG. 2 is an exploded view of the locking grommet system of FIG. 1, according to an embodiment of the present disclosure.
Figure 3A:
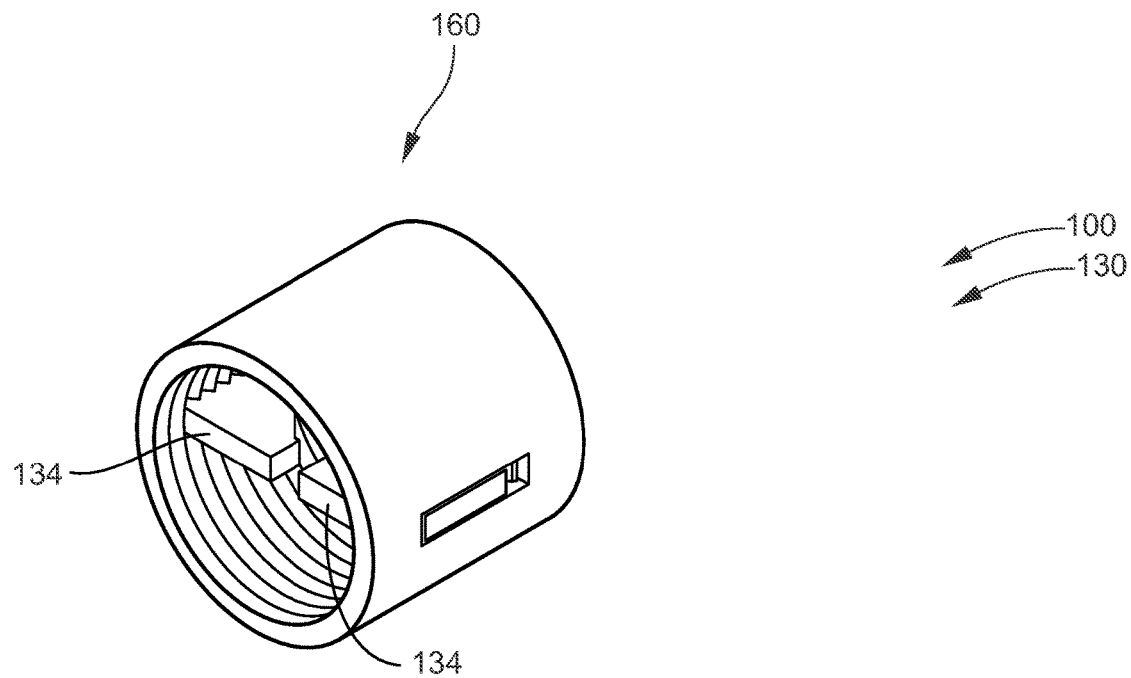
FIG. 3A is a detailed view of the locking collar of the locking grommet system of FIG. 1 in a retracted position, according to an embodiment of the present disclosure.
Figure 3B:
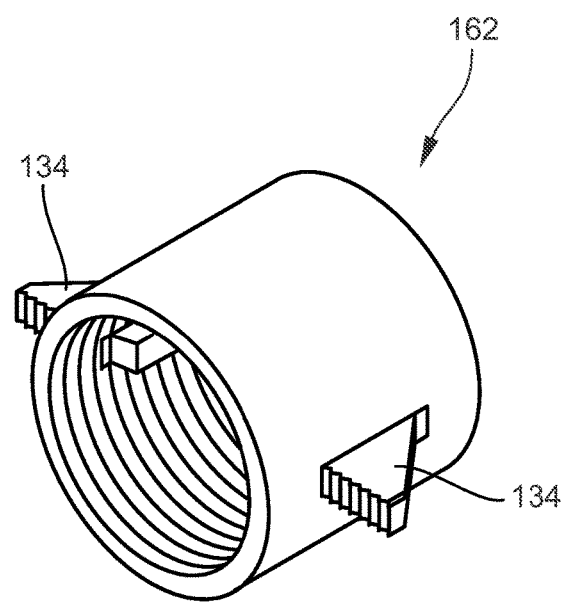
FIG. 3B is a detailed view of the locking collar of the locking grommet system of FIG. 1 in an extended position, according to an embodiment of the present disclosure.
Figure 4:
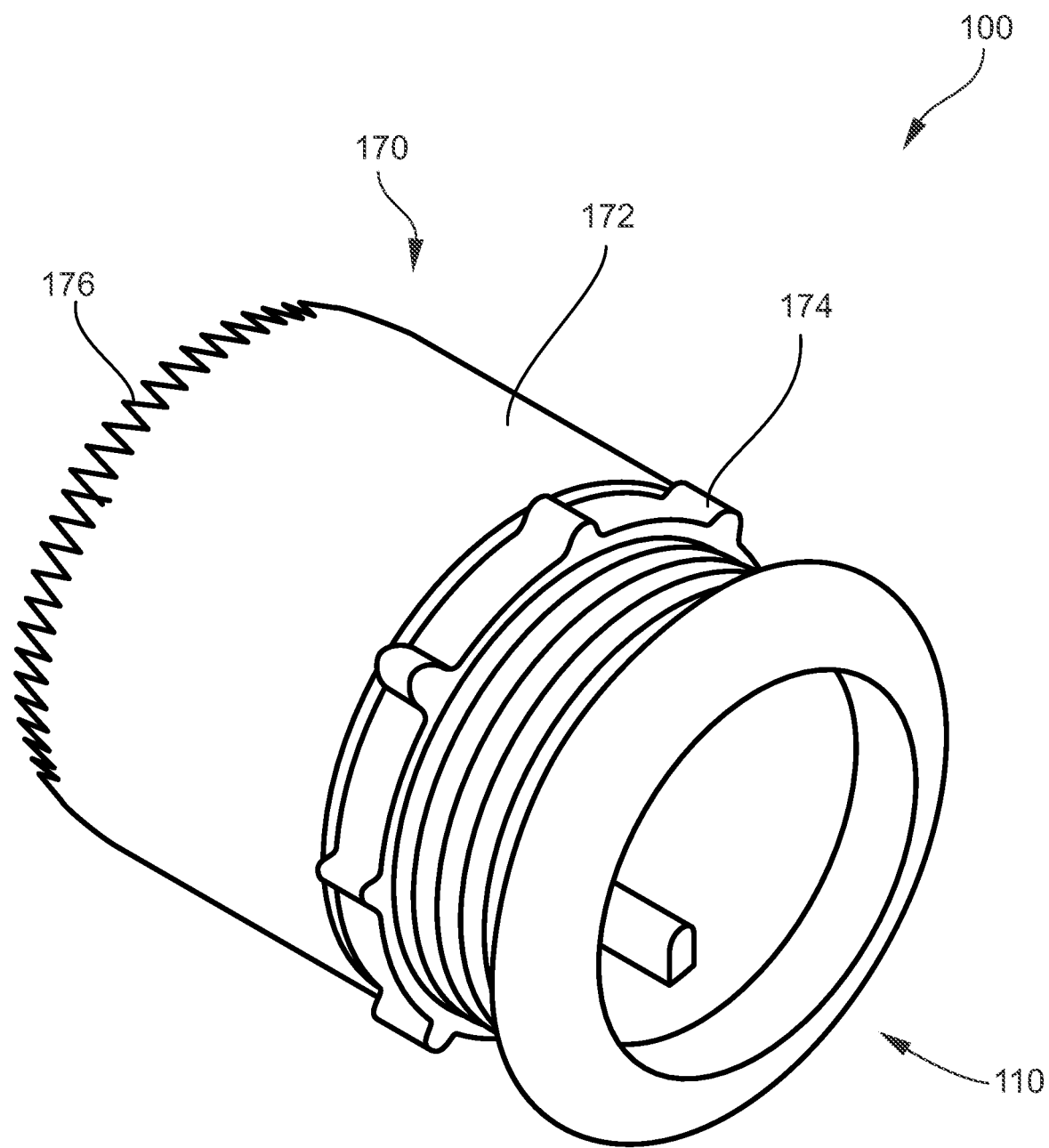
FIG. 4 is a perspective view of the locking grommet system including the cutting tool of FIG. 1, according to an embodiment of the present disclosure.

FIG. 1 shows a locking grommet system 100 during an 'in use' condition 150, according to an embodiment of the present disclosure. Here, the locking grommet system 100 may be beneficial for use by a user to provide a device to protect and seal an opening in a wall 30 where electrical wire 50 or other similar item may pass through. As illustrated (in FIGS. 1 4), locking grommet system 100 may include threaded tube 110, locking collar 130, cutting tool 170, and cover plate 180.

According to one embodiment, locking grommet system 100 may be arranged as a kit 105. In particular, locking grommet system 100 may further include set of instructions 155. Instructions 155 may detail functional relationships in relation to the structure of locking grommet system 100 such that locking grommet system 100 can be used, maintained, or the like, in a preferred manner.

FIGS. 1-4 show locking grommet system 100, according to embodiments of the present disclosure. As above, locking grommet system 100 may include threaded-tube 110, locking-collar 130, cutting-tool 170, cover-plate 180, and a trim-ring. Threaded-tube 110 is cylindrical in shape and may include first-edge 112, second-edge 114, inside-surface 116, and outside-surface 118; where outside-surface 118 may include male threads 120; first-edge 112 may include lip 122, where lip 122 may be configured to contact first-wall-surface 10 and lip 122 may include a gasket (not shown) to contact first-wall-surface 10. Also included in threaded-tube 110 may be at least two tabs 124 integrated onto inside-surface 116 configured to provide the user with a mechanism to rotate threaded-tube 110 in relation to locking-collar 130. Cover plate 180 may be insertable into first-edge 112 and configured to decrease the size of the opening of threaded-tube 110. Also, trim-ring may be removably coupleable to threaded-tube 110 and may be configured to create a finished edge and/or appearance.

Locking-collar 130 is cylindrical in shape and includes collar-body 132, and locking-tabs 134. Locking-tabs 134 may include textured surface 146 to increase friction between wall 30 and locking-tabs 134. Collar body 132 includes front-edge 136, rear-edge 138, interior-surface 140, and exterior-surface 142. Also, interior-surface 140 may include female threads 144 configured to couple with male-threads 120 of threaded-tube 110. Also, locking-tabs 134 are configured to rotate outwardly from retracted position 160 to extended position 162 to contact second-wall-surface 20. Locking grommet system 100 may be configured to penetrate wall 30 such that the user may pass object 40 through the wall 30 penetration, and therefore locking grommet system 100 provides reduced risk of damage to object(s) 40.

Objects 40 may include at least one electrical wire 50, in some embodiments. Other embodiments may include other objects (e.g., conduit, pipe, etc.). Some embodiments need not include anything passing through locking grommet system 100. Further, locking grommet system 100 may be constructed from a selected color such that an individual may identify the type of electrical wire 50 (or other object) passing through locking grommet system 100.

Cutting tool 170 may include circular-blade 172 and threaded-body 174, with circular-blade 172 affixed to one end of cutting tool 170. As such, threaded-body 174 may be cylindrical in shape and include threads such that threaded-body 174 may be removably coupleable to threaded-tube 110 and may be configured to cut a circular hole in wall 30.

Also, circular-blade 172 may include teeth 176 constructed from a metallic material for increased hardness and durability.

First-wall-surface 10 and secondary-wall-surface 20 may be constructed from a drywall material, in some instances. Other instances may include other materials. Male threads 120 and female threads 144 may include right-hand-threads in some embodiments. Further embodiments may include male threads 120 and female threads 144 which include left-hand-threads.

Figure 5:
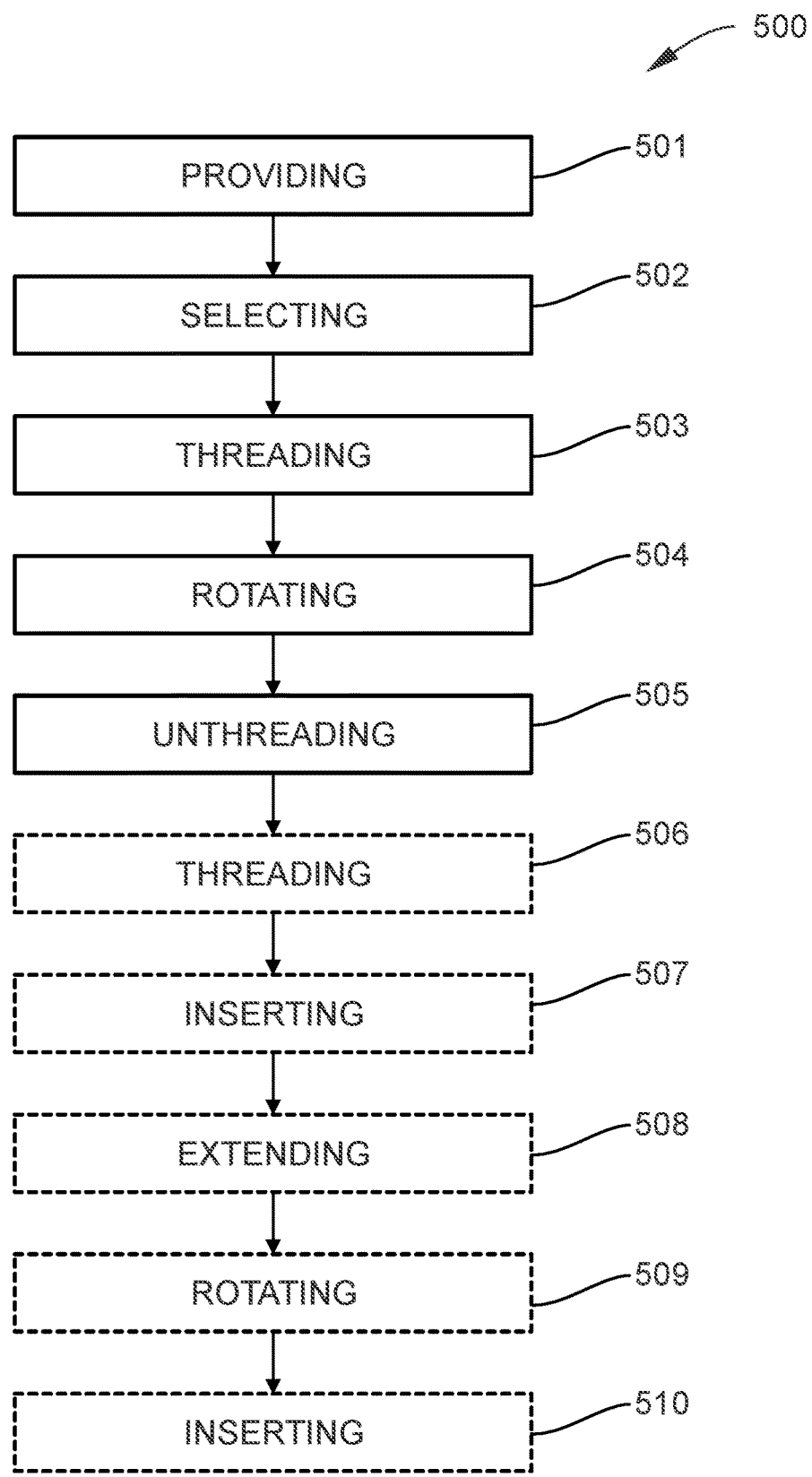
FIG. 5 is a flow diagram illustrating a method of use for a locking grommet system, according to an embodiment of the present disclosure.

FIG. 5 is a flow diagram illustrating method of using a locking grommet system 500, according to an embodiment of the present disclosure. In particular, method of using a locking grommet system 500 may include one or more components or features of locking grommet system 100 as described above. As illustrated, method of using a locking grommet system 500 may include the steps of: step one 501, providing locking grommet system 100, locking grommet system 100 including threaded-tube 110, locking-collar 130, and cutting-tool 170; step two 502, selecting a location on wall 30 where a hole is desired; step three 503, threading cutting-tool 170 onto threaded-tube 110; step four 504, rotating cutting-tool 170 against wall 30 to cut a hole in wall 30; step five 505, unthreading cutting-tool 170 from threaded-tube 110; step six 506, threading locking-collar 130 onto threaded-tube 110; step seven 507, inserting locking-collar 130 and threaded-tube 110 into the hole in wall 30; step eight 508, rotating locking-tabs 134 outward into extended position 162 (while pulling system 100 towards the user to provide minimal pressure upon second-side 20 of wall 30); step nine 509, rotating threaded-tube 110 in relation to locking-collar 110 until locking-tabs 134 contact wall 30; and step ten 510, inserting electrical wire 50 through locking grommet system 100.

It should be noted that step six 506, step seven 507, step eight 508, step nine 509, and step ten 510 may be optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods of using a locking grommet system [NOTE: e.g., different step orders within above-mentioned list, elimination or addition of certain steps, including or excluding certain maintenance steps, etc.], are taught herein. Those with ordinary skill in the art will now appreciate that upon reading this specification and by their understanding the arts of construction and electrical systems as described herein, methods of installation of a locking grommet system will be understood by those knowledgeable in such art.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

Upon reading this specification, it should be appreciated that, under appropriate circumstances, considering such issues as user preferences, design preference, structural requirements, marketing preferences, cost, available materials, technological advances, etc., other arrangements may be sufficient.

What is claimed is new and desired to be protected by Letters Patent is set forth in the appended claims:

1. A locking grommet system comprising:
   a cylindrical threaded-tube including
      a first edge including a wall surface contact lip,
      a second edge,
      an inside surface,
      and
      a threaded outside surface;
   and
   a cylindrical locking-collar including a cylindrical collar-body, and locking-tabs, the collar body including
      a front edge,
      a rear edge,
      a threaded interior surface,
      and
      an exterior surface,
      wherein locking collar threads couple with the threaded tube,
      and
   wherein the locking-tabs rotate outwardly from a retracted position
      to an extended position.

2. The system of claim 1, further comprising a cover plate insertable into the first edge and configured to decrease the size of the opening.

3. The system of claim 1, wherein the locking-tabs include a textured surface to increase friction between the wall and the locking-tabs.

4. The system of claim 1, wherein the first-wall surface is constructed from a drywall material.

5. The system of claim 1, wherein the penetration has a size that accommodates at least one electrical wire.

6. The system of claim 5, wherein the grommet system comprises a color to identify the type of electrical wire passing through the grommet system.

7. The system of claim 1, wherein the system further comprises a gasket disposed next to the lip and in the installed configuration the gasket is disposed between the lip and the wall surface.

8. The system of claim 1, further including a cutting-tool with a female threaded body wherein a circular blade connects to one end of the cutting tool.

9. The system of claim 1 wherein in an installed configuration the locking grommet penetrates a wall with the lip contacting an outside of the wall and locking tabs contacting the inside of a wall.

10. The system of claim 9, wherein the threaded tube includes a rotation tab integrated into the inside surface configured and arranged to facilitate rotation of the threaded tube into the locking-collar.

11. The system of claim 9, wherein the male and female threads include right-hand threads.

12. The system of claim 9, wherein the male and female threads include left-hand threads.

13. The system of claim 9, wherein the threaded tube comprises a chromed metallic material.

14. The system of claim 1, wherein a grommet of the grommet system comprises a non-metallic material to render the grommet electrically non-conductive.

15. The system of claim 14, wherein the grommet comprises a polystyrene material.

16. A locking grommet system comprising:
- a threaded tube, the threaded tube being cylindrical in shape and including a first edge, a second edge, an inside-surface, and an outside-surface, with the outside-surface including male threads, and with the first edge including a lip, where the lip is configured to contact a first wall surface;
- a locking-collar, the locking-collar being cylindrical in shape and including a collar-body which is cylindrical in shape and locking-tabs, the collar body including a front edge, a rear edge, an interior-surface, and an exterior-surface, with the interior-surface including females threads configured to couple with the male-threads of the threaded tube, and the locking-tabs configured to rotate outwardly from a retracted position to an extended position to contact a second wall surface;
- a cover plate, the cover plate insertable into the first edge and configured to decrease the size of the opening of the threaded tube; wherein the locking grommet system is configured to penetrate a wall such that a user may pass objects through the wall penetration and therefore the locking grommet system with reduced risk of damage to the object;

wherein the locking-tabs include a textured surface to increase friction between the wall and the locking-tabs;

wherein the threaded tube includes at least two tabs integrated onto the inside-surface configured to provide the user with a mechanism to rotate the threaded tube in relation to the locking-collar;

wherein the threaded tube and the locking-collar are constructed from a non-metallic material such that the system is non-electrically conductive; and wherein the threaded-tube and the locking-collar are constructed from a polystyrene material.

17. The system of claim 16, further comprising a set of instructions; and wherein the system components and instructions are arranged as a kit.

* * * * *